US005599628A

United States Patent [19]

Gardner

[11] Patent Number: 5,599,628
[45] Date of Patent: Feb. 4, 1997

[54] ACCELERATED CYCLOALIPHATIC EPOXIDE/AROMATIC AMINE RESIN SYSTEMS

[75] Inventor: Hugh C. Gardner, Somerville, N.J.

[73] Assignee: Amoco Corporation, Chicago, Ill.

[21] Appl. No.: 583,357

[22] Filed: Mar. 1, 1984

[51] Int. Cl.$^6$ ..................................................... B32B 27/38
[52] U.S. Cl. ........................ 428/413; 525/524; 525/525; 525/526
[58] Field of Search ........................ 528/87, 99; 428/413; 525/524, 525, 526

[56] References Cited

U.S. PATENT DOCUMENTS

| | | | |
|---|---|---|---|
| 2,935,488 | 5/1960 | Phillips et al. | 528/87 |
| 3,019,202 | 1/1962 | Tinsley et al. | 528/87 |
| 3,398,102 | 8/1968 | Soldatos et al. | 260/2 |
| 3,547,881 | 12/1970 | Mueller et al. | 528/87 |
| 4,370,382 | 1/1983 | Salensky | 528/87 |
| 4,517,321 | 5/1985 | Gardner et al. | 528/124 |
| 4,593,056 | 6/1986 | Qureshi et al. | 528/124 |
| 4,665,150 | 5/1987 | Tesch et al. | 528/99 |
| 4,686,250 | 8/1987 | Qureshi | 528/99 |

FOREIGN PATENT DOCUMENTS

82/04256  12/1982  WIPO ...................................... 528/87

OTHER PUBLICATIONS

Sohechter et al, *Ind. & Eng. Chem.*, 48(#1), 94–97 (1956).
Bowen et al., *ACS Advances in Chemistry*, 92, 48–59 (1970).
Gough et al, *J. of Oil & Color Chem. Assn*, 43, 409–418 (1961).
Nagy, *Adhesives Age*, Apr. 1967, 20–27.
Partensky, *ACS Advances in Chemistry*, 92, 29–47 (1970).
Markovitz, "Chemical Properties of Crosslinked Polymers", ACS Symposium (1976) pp. 49–58.
McLean et al, Report No. 14450, Natl. Research Council of Canada (1974).

*Primary Examiner*—Charles T. Jordan
*Assistant Examiner*—John R. Hardee
*Attorney, Agent, or Firm*—Richard J. Schlott; Stephen L. Hensley

[57] ABSTRACT

Described herein are compositions containing (a) a cycloaliphatic epoxy resin, (b) an aromatic amine hardener, and (c) a particular cure accelerator. These compositions afford unreinforced castings with a high level of mechanical properties and improved heat deflection temperatures.

11 Claims, No Drawings

ACCELERATED CYCLOALIPHATIC EPOXIDE/AROMATIC AMINE RESIN SYSTEMS

BACKGROUND OF THE INVENTION

Amine curable epoxy resin formulations are widely used as coatings, adhesives, sealants, and matrices for fiber-reinforced composites. For many applications, a fast rate of cure is desirable.

Many additives have been tested as cure accelerators for epoxy/amine mixtures. Several references teach that additives with phenolic hydroxyl groups are effective with epoxy resins derived from epihalohydrins and active hydrogen compounds, such as bisphenol A epoxy resins. For example, Shechter et al in Industrial and Engineering Chemistry, Volume 48, No. 1, pages 94 to 97, 1956, disclosed that phenol was more effective than aliphatic alcohols in accelerating the reaction of phenyl glycidyl ether with diethylamine. Bowen et al in the American Chemical Society Advances in Chemistry Series, Volume 92, pages 48 to 59, 1970, disclosed that a variety of hydroxyl containing compounds decreased the gel time of a bisphenol A epoxy/ triethylenetetramine mixture. Bowen et al disclosed that 4,4'-dihydroxydiphenyl sulfone, glycerin, phenol, tetrabromobisphenol A, and hisphenol A accelerated the cure with a similar degree of effectiveness.

Epoxy compositions containing resorcinol are described in the prior art. For example, Gough et al (in the Journal of Oil and Color Chemists Association, volume 43, pages 409 to 418, 1961), Nagy (in Adhesives Age, pages 20 to 27, April, 1967), and Pattensky (in the American Chemical Society Advances in Chemistry Series, Volume 92, pages 29 to 47, 1970) disclosed that resorcinol and many other phenolic compounds accelerate the cure of glycidyl epoxy/amine mixtures. Markovitz in "Chemical Properties of Crosslinked Polymers," American Chemical Society Symposium 1976, S. S. Labana, Ed., pages 49 to 58 described curable compositions containing cycloaliphatic epoxides, resorcinol and metal salts as coaccelerators. No reference was found to cycloaliphatic epoxide/aromatic amine mixtures containing resorcinol as an accelerator.

In many epoxy/amine formulations, cycloaliphatic epoxides are used as the epoxy component since they impart improved mechanical and thermal properties to the cured compositions. For example, unreinforced castings of bis(2,3-epoxycyclopentyl) ether cured with m-phenylenediamine have tensile strengths and tensile moduli which are among the highest of any thermosetting material. Similarly, as described by McLean et. al. in Report No. 14450 of the National Research Council of Canada, November, 1974, high mechanical properties can be achieved in unreinforced castings made by curing 3,4-epoxycyclohexylmethyl 3,4-epoxycyclohexane carboxylate with methylene dianiline. However, resin systems containing bis(2,3-epoxycyclopentyl) ether or 3,4-epoxycyclohexylmethyl 3,4-epoxycyclohexane carboxylate cure more slowly with aromatic amines than similar compositions containing hisphenol A epoxy resins. This characteristic limits their utility in composite fabrication processes such as filament winding and reaction injection molding. Thus there is a need for cure accelerators for cycloaliphatic epoxide/amine resin systems. Moreover, in commercial practice it is desirable that the mixture of the accelerator and epoxy resin have good storage stability in the absence of the amine hardener. This characteristic facilitates handling in a production environment.

It has now been found that a select group of phenolic compounds are highly effective cure accelerators for cycloaliphatic/aromatic amine resin systems. Under a fixed cure schedule, the accelerated compositions afford improved properties compared to compositions which do not contain the accelerator, such as higher mechanical properties and/or increased heat deflection temperatures in unreinforced castings.

Further, a method for accelerating the cure of cycloaliphatic epoxide/aromatic amine mixtures at low temperatures has been found which comprises adding a solid solution of a high melting accelerator in a low melting solid cycloaliphatic epoxy resin.

THE INVENTION

This invention is directed to a composition comprising:

(a) a cycloaliphatic epoxy resin containing two or more epoxide groups, (b) an aromatic amine hardener, and (c) a cure accelerator selected from

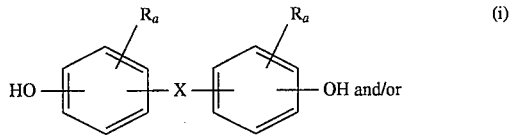

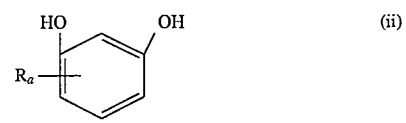

wherein X is selected from $SO_2$, $SO$, $C(CF_3)_2$,

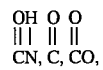

R is selected from halogen or alkyl of 1 to 4 carbon atoms, or

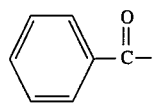

and a is 0 to 2.

The composition may optionally contain a thermoplastic polymer and/or a structural fiber.

The preferred cure accelerators are one or more of the following: 4,4'-dihydroxydiphenyl sulfone, resorcinol, 2,2-bis (4-hydroxyphenyl) hexafluoropropane, 4,4'-dihydroxydiphenyl sulfoxide, 2,4-dihydroxybenzophenone, 4,4'-dihydroxybenzophenone, and 4,4'-dihydroxy-3,3-dichlorodiphenyl sulfone.

The cycloaliphatic epoxides of this invention are prepared by epoxidation of dienes or polyenes. Resins of this type include bis(2,3-epoxycyclopentyl) ether, I,

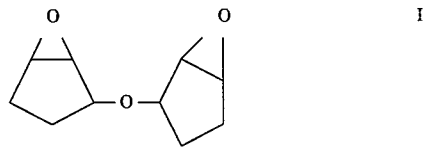

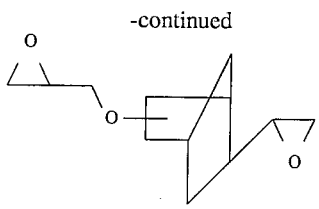

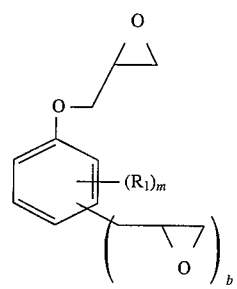

reaction products of I with ethylene glycol which are described in U.S. Pat. No. 3,398,102, 5(6)-glycidyl-2-(1,2-epoxyethyl)bicyclo[2.2.1]heptane, II, and dicyclopentadiene diepoxide. Commercial examples of these epoxides include vinyl cyclohexene diepoxide, e.g., "ERL-4206" (obtained from Union Carbide Corp.), 3,4-epoxycyclohexylmethyl 3,4-epoxycyclohexane carboxylate, e.g., "ERL-4221" (obtained from Union Carbide Corp.), 3,4-epoxy-6-methyl-cyclohexylmethyl 3,4-epoxy-6-methylcyclohexane carboxylate, e.g., "ERL-4201" (obtained from Union Carbide Corp.), bis(3,4-epoxycyclohexylmethyl)adipate, e.g., "ERL-4299" (obtained from Union Carbide Corp.), dipentene dioxide, e.g., "ERL-4269" (obtained from Union Carbide Corp.) 2-(3,4-epoxycyclohexyl-5,5-spiro-3,4-epoxy)cyclohexane meta-dioxane, e.g., "ERL-4234" (obtained from Union Carbide Corp.) and epoxidized poly-butadiene, e.g., "Oxiron 2001" (obtained from FMC Corp.)

Other suitable cycloaliphatic epoxides include those described in U.S. Pat. Nos. 2,750,395: 2,890,194: and 3,318,822 which are incorporated herein by reference, and the following:

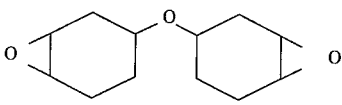

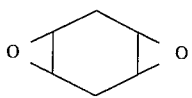

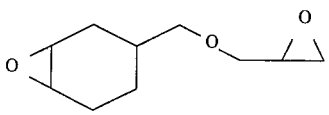

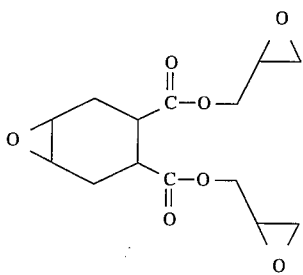

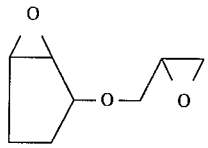

Other suitable epoxides include:

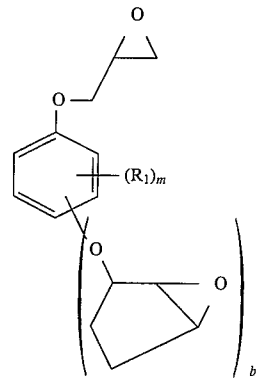

where b is 1 to 4, m is (5-b), and $R_1$ is H, halogen, or $C_1$ to $C_4$ alkyl.

Coepoxides may be used with the cycloaliphatic epoxide of this invention. These coepoxides are called polyglycidyl compounds. They contain a plurality of 1,2-epoxide groups derived from the reaction of a polyfunctional active hydrogen containing compound with an excess of an epihalohydrin under basic conditions. When the active hydrogen compound is a polyhydric alcohol or phenol, the resulting epoxide resin contains glycidyl ether groups. A preferred group of polyglycidyl compounds are made via condensation reactions with 2,2-bis(4-hydroxyphenyl)propane, also known as bisphenol A, and have structures such as III:

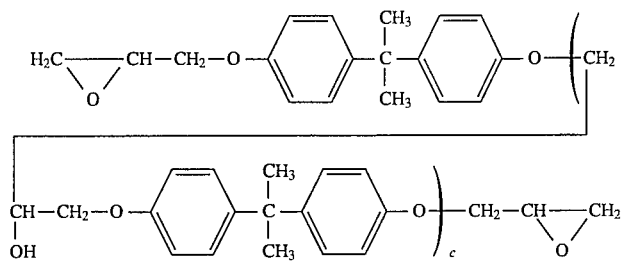

III

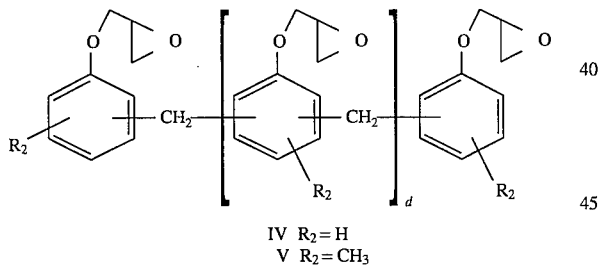

where c has a value from about 0 to about 15. These epoxides are bisphenol-A epoxy resins. They are available commercially under the trade names such as "Epon 828," "Epon 1001", and "Epon 1009" from Shell Chemical Co., and as "DER 331", and "DER 334" from Dow Chemical Co. The most preferred bisphenol A epoxy resins have an "c" value between 0 and 10.

Polyepoxides which are polyglycidyl ethers of 4,4'-dihydroxydiphenyl methane, 4,4'-dihydroxydiphenyl sulfone, 4,4'-biphenol, 4,4° -dihydroxydiphenyl sulfide, phenolphthalein, resorcinol, 4,2'-biphenol, or tris(4-hydroxyphenyl) methane and the like, are useful in this invention. In addition, EPON 1031 (a tetraglycidyl derivative of 1,1,2,2-tetrakis(hydroxyphenyl)ethane from Shell Chemical Company), and Apogen 101, (a methylolated hisphenol A resin from Schaefer Chemical Co.) may also be used. Halogenated polyglycidyl compounds such as D.E.R. 580 (a brominated bisphenol A epoxy resin from Dow Chemical Company) are also useful. Other suitable epoxy resins include polyepoxides prepared from polyols such as pentaerythritol, glycerol, butanediol or trimethylolpropane and an epihalohydrin.

Polyglycidyl derivatives of phenol-formaldehyde novolaks such as IV where d=0.1 to 8 and cresol-formaldehyde novolaks such as V where d=0.1 to 8 are also useable.

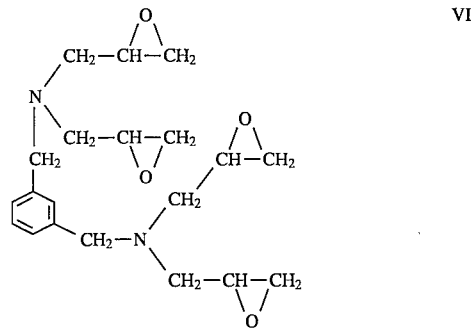

IV $R_2 = H$
V $R_2 = CH_3$

The former are commercially available as D.E.N 431, D.E.N. 438, and D.E.N. 485 from Dow Chemical Company. The latter are available as, for example, ECN 1235, ECN 1273, and ECN 1299 (obtained from Ciba-Geigy Corporation, Ardsley, N.Y.). Other epoxidized novolaks such as SU-8 (obtained from Celanese Polymer Specialties Company, Louisville, Ky.) are also suitable.

Other polyfunctional active hydrogen compounds besides phenols and alcohols may be used to prepare the polyglycidyl adducts of this invention. They include amines, aminoalcohols and polycarboxylic acids.

Adducts derived from amines include N,N-diglycidyl aniline, N,N-diglycidyl toluidine, N,N,N',N'-tetraglycidylxylylene diamine, (i.e., VI) N,N,N',N'-tetraglycidyl-bis(methylamino) cyclohexane (i.e. VII) , N,N,N',N'-tetraglycidyl-4,4'-diaminodiphenyl methane, (i.e. VIII) N,N,N',N'-tetraglycidyl-3,3'-diaminodiphenyl sulfone, and N,N'-dimethyl-N,N'-diglycidyl-4,4'-diaminodiphenyl methane. Commercially available resins of this type include Glyamine 135 and Glyamine 125 (obtained from F.I.C. Corporation, San Francisco, Calif.), Araldite MY-720 (obtained from Ciba Geigy Corporation) and PGA-X and PGA-C (obtained from The Sherwin-Williams Co., Chicago, Ill.).

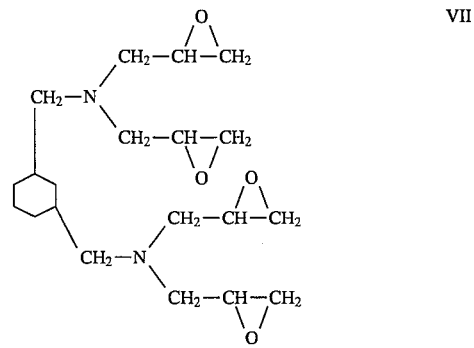

VI

VII

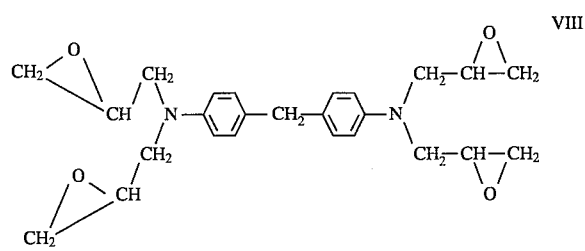

VIII

Suitable polyglycidyl adducts derived from amino alcohols include O,N,N-triglycidyl-4-aminophenol. available as Araldite 0500 or Araldite 0510 (obtained from Ciba Geigy Corporation) and O,N,N-triglycidyl-3-aminophenol (available as Glyamine 115 from F.I.C. Corporation).

Also suitable for use herein are the glycidyl esters of carboxylic acids. Such glycidyl esters include, for example, diglycidyl phthalate. diglycidyl terephthalate, diglycidyl isophthalate, and diglycidyl adipate. There may also be used polyepoxides such as triglycidyl cyanurates and isocyanurates, N,N-diglycidyl oxamides, N,N'-diglycidyl derivatives of hydantoins such as "XB 2793" (obtained from Ciba Geigy Corporation), diglycidyl esters of cycloaliphatic dicarboxylic acids, and polyglycidyl thioethers of polythiols.

Other epoxy-containing materials are copolymers of acrylic acid esters of glycidol such as glycidyl acrylate and glycidyl methacrylate with one or more copolymerizable vinyl compounds. Examples of such copolymers are 1:1 styrene-glycidyl methacrylate, 1:1 methyl methacrylate-glycidyl acrylate and 62.5:24:13.5 methyl methacrylate:ethyl acrylate:glycidyl methacrylate.

Silicone resins containing epoxy functionality, e.g., 2,4,6,8,10-pentakis [3-(2,3-epoxypropoxy)propyl]-2,4,6,8,10-pentamethylcyclopentasiloxane and the diglycidyl ether of 1,3-bis-(3-hydroxypropyl)tetramethyldisiloxane are also useable.

Reactive diluents containing one epoxide group such as t-butylphenyl glycidyl ether, may also be used. The reactive diluent may comprise up to 25 percent by weight of the epoxide component.

The reactive diluent and coepoxide are used in amounts of up to 40, preferably 30 percent by weight.

The preferred epoxy resins are bis(2,3-epoxycyclopentyl)ether, vinyl cyclohexene diepoxide, 2-(3,4-expoxycyclohexyl-5,5-spiro-3,4 epoxy)cyclohexane meta-dioxane, the diepoxides of allyl cyclopentenyl ether, 1,4-cyclohexadiene diepoxide, 3,4-epoxycyclohexylmethyl 3,4-epoxycyclohexane carboxyl ate, and bis(3,4-epoxycyclohexylmethyl)adipate.

The hardeners which may be used in the composition of this invention are selected from one or more of the following: 4,4'-diaminodiphenyl ether, 4,4'-diaminodiphenyl methane, 3,3'-diaminodiphenyl methane, 4,4'-diaminodiphenyl sulfone, m-phenylenediamine, p-phenylenediamine, 4,4'-diaminodiphenylpropane, 4,4'-diaminodiphenyl sulfide, 1,4-bis(p-aminophenoxy)benzene, alkylated derivatives of 4,4'-diaminodiphenyl methane such as 3,3'-diisopropyl-4,4'-diaminodiphenyl methane, 1,3-his(m-aminophenoxy)benzene, diethyl toluenediamine, 1,3-bis(p-aminophenoxy) benzene, adducts of epoxy resins with the above diamines, such as the adduct formed by reacing one mole of a liquid bisphenol-A epoxy resin with 2 to 4 moles of m-phenylenediamine by itself or in combination with 4,4'-diaminodiphenyl methane or the adducts of a bisphenol-A epoxy resin with a molar excess of 4,4-diaminodiphenyl sulfone, as described in U.S. Pat. No. 4,330,659, 4,4'-bis(3-aminophenoxy)diphenyl sulfone, 2,2-bis(4-aminophenoxyphenyl) propane and trimethylene glycol di-para-aminobenzoate.

The preferred hardeners are m-phenylenediamine, 4,4'-diaminodiphenyl methane, low melting mixtures of m-phenylenediamine and 4,4'-diaminodiphenyl methane, 2,2-bis(4-aminophenoxyphenyl) propane and the adduct formed by reacting one mole of a liquid bisphenol-A epoxy with 2 to 4 moles of m-phenylenediamine.

The compositions of this invention may optionally contain a thermoplastic polymer. These materials have beneficial effects on the viscosity and film strength characteristics of the epoxy/hardener/accelerator mixture.

The thermoplastic polymers used in this invention include polyarylethers of formula IX which are described in U.S. Pat. Nos. 4,108,837 and 4,175,175,

wherein $R_3$ is a residuum of a dihydric phenol such as hisphenol A, hydroquinone, resorcinol, 4,4-biphenol, 4,4'-dihydroxydiphenyl sulfone, 4,4'-dihydroxy-3,3'5,5'-tetramethyldiphenyl sulfide, 4,4'-dihydroxy-3,3',5,5'-tetramethyldiphenyl sulfone and the like. $R_4$ is a residuum of a benzenoid compound susceptible to nucleophilic aromatic substitution reactions such as 4,4'-dichlorodiphenyl sulfone, 4,4'-difluorobenzophenone, and the like. The average value of e is from about 8 to about 120.

These polymers may have terminal groups which react with epoxy resins, such as hydroxyl or carboxyl, or terminal groups which do not react.

Other suitable polyarylethers are described in U.S. Pat. No. 3,332,209.

Also suitable are polyhydroxyethers of formula X.

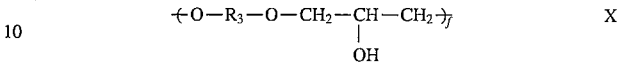

where $R_3$ has the same meaning as for Formula IX and the average value of f is between about 8 and about 300; and polycarbonates such as those based on bisphenol A, tetramethyl bisphenol A, 4,4'-dihydroxydiphenyl sulfone, 4,4'-dihydroxy-3,3',5,5'-tetramethyldiphenyl sulfone, hydroguinone, resorcinol, 4,4'-dihydroxy-3,3',5,5'-tetramethyldiphenyl sulfide, 4,4'biphenol, 4,4'-dihydroxydiphenyl sulfide, phenolphthalein, 2,2,4,4-tetramethyl-1,3-cyclobutane diol, and the like. Other suitable thermoplastics include poly (ε-caprolactone); polybutadiene; polybutadiene/acrylonitrile copolymers, including those optionally containing amine, carboxyl, hydroxyl, or —SH groups; polyesters, such as poly(butylene terephthalate); poly(ethylene terephthalate); polyetherimides such as the Ultem resins (obtained from the General Electric Company): acrylonitrile/butadiene/styrene terpolymers, polyamides such as nylon 6, nylon 6,6, nylon 6,12, and Trogamid T (obtained from Dynamit Nobel Corporation); poly(amide imides) such as Torlon poly(amide imide) (obtained from Amoco Chemical Corporation, Napierville, Ill.); polyolefins; polyethylene oxide: poly(butyl methacrylate); impact-modified polystyrene: sulfonated polyethylene: polyarylates such as those derived from bisphenol A and isophthalic and terephthalic acid: poly(2,6-dimethyl phenylene oxide): polyvinyl chloride and its copolymers; polyacetals; polyphenylene sulfide and the like.

The compositions of this invention may include a structural fiber. The structural fibers which are useful in this invention include carbon, graphite, glass, silicon carbide, poly(benzothiazole), poly(benzimidazole), poly(benzoxazole), alumina, titania, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers, such as Kevlar 49 fiber (obtained from E.I. dupont de Nemours, Inc., Wilmington, Del.), and silicon carbide fibers.

The composition contains from about 20 to about 90 percent by weight of cycloaliphatic epoxide, from about 15 to about 80, preferably from about 20 to about 70 percent by weight of hardener. The composition also contains from 0.1 to about 10, preferably from 0.1 to about 8 percent by weight of the accelerator. The thermoplastic polymer may be used in amounts up to 20 percent by weight of the total composition. The structural fiber may be used in amounts of up to 90, preferably between about 20 and about 85 percent by weight of the total composite.

In the compositions of this invention, the molar ratio of amine NH groups to epoxy groups is 0.5 to 2.0, preferably 0.6 to 1.7.

Preimpregnated reinforcement may be made from the compositions of this invention by combining epoxy resins, hardener, accelerator, and optionally thermoplastic polymer with the structural fiber.

Preimpregnated reinforcement may be prepared by several techniques known in the art, such as wet winding or hot melt. In wet winding, a continuous tow of reinforcement is passed through a resin bath containing a mixture of the cycloaliphatic epoxide, the amine hardener, accelerator and optionally, the thermoplastic polymer. After the tow is impregnated with the resin, it is passed through squeeze rolls to remove excess resin. Preferably, because of the fast curing characteristics of these compositions, the preimpregnated reinforcement is used to make a composite article soon after it is prepared.

Composites may be prepared by curing preimpregnated reinforcement using heat and pressure. Vacuum bag/autoclave cures work well with these compositions. Laminates may also be prepared via wet layup followed by compression molding, resin transfer molding, or by resin injection, as described in European Patent Application 0019149 published Nov. 26, 1980. Typical cure temperatures are from about 100° F. to about 500° F., preferably from about 180° F. to about 450° F. Cure times may be as short as from about 1 to about 2 minutes depending on the composition utilized.

The compositions of this invention are well suited for filament winding. In this composite fabrication process, continuous reinforcement in the form of tape or tow—either previously impregnated with resin or impregnated during winding—is placed over a rotating and removable form or mandrel in a previously determined pattern. Generally the shape is a surface of revolution and contains end closures. When the proper number of layers are applied, the wound form is cured in an oven or autoclave and the mandrel removed.

The compositions of this invention may be used as aircraft parts such as wing skins, wing-to-body fairings, floor panels, flaps, radomes: as automotive parts such as driveshafts, bumpers, and springs: and as pressure vessels, tanks and pipes. They are also suitable for sporting goods applications such as golf shafts, tennis rackets, and fishing rods.

In addition to structural fibers, the composition may also contain particulate fillers such as talc, mica, calcium carbonate, aluminum trihydrate, glass microballoons, phenolic thermospheres, and carbon black. Up to half of the weight structural fibers in the composition may be replaced by filler. Thixotropic agents such as fumed silica may also be used.

Further, the compositions may be used in adhesives, potting and encapsulation compounds, and in coating applications.

EXAMPLES

The following examples serve to give specific illustrations of the practice of this invention but they are not intended in any way to limit the scope of this invention.

In the Examples which follow, the epoxy equivalent weight (EEW) is defined as the grams of epoxy resin per mole of 1,2 epoxide group.

Examples 1 through 4 and Controls A through H describe effects of accelerators on the viscosity of cycloaliphatic epoxide/aromatic amine mixtures.

Example 1

A 250 ml, three necked flask equipped with a paddle stirrer, thermometer with a Therm-O-Watch Controller, an inlet and outlet for nitrogen, and an electric heating mantle was charged with 190 g bis(2,3-epoxycyclopentyl) ether and 10 g of 4,4'-dihydroxydiphenyl sulfone. The mixture was heated and stirred at a temperature of 100° C. for 1 hour to dissolve the bisphenol.

A 100 g portion of the dihydroxydiphenyl sulfone/bis(2,3-epoxycyclopentyl ether solution was placed in a 4 ounce jar in an oil bath maintained at a temperature of 66° C. Then 30.7 g of m-phenylenediamine (MPDA) was added. The mixture was stirred for about five minutes until the diamine dissolved. The viscosity of the solution was measured with a Brookfield viscometer (obtained from Brookfield Engineering Laboratories, Stoughton, Mass.) at fixed intervals. The viscosity was 25 centipoises after 0.5 hours and 35 centipoises after 1.0 hour. After 1.5 hours, the mixture gelled and increased in temperature.

Example 2

A flask equipped as in Example 1 was charged with 10 g of resorcinol and 190 g of bis(2,3-epoxycyclopentyl) ether. The mixture was stirred and heated at a temperature of 80° C. for 1 hour to dissolve the resorcinol. Then a 100 g portion of the solution was transferred to a 4 ounce jar in an oil bath at a temperature of 66° C. and treated with 30.7 g of MPDA. The viscosity of the mixture at various times is shown in Table I.

Example 3

A flask equipped as in Example 1 was charged with 10 g of 4,4'-dihydroxybenzophenone and 190 g of bis(2,3-epoxycyclopentyl)ether. The mixture was heated at a temperature of 120° C. for 1 hour to dissolve the diphenol. Then a 100 g portion of the solution was transferred to a 4 ounce jar in an oil bath at a temperature of 66° C. and treated with 30.7 g of MPDA. The viscosity of the mixture at various times is shown in Table I.

Controls A through F

A series of other hydroxyl compounds were screened as accelerators for bis(2,3-epoxycyclopentyl) ether/MPDA mixtures using the procedure described in Example 1. As shown by the data in Table I, none of these additives caused the mixture to gel in 1.5 hours. To determine if additional heating would cause gelation, samples which had been held at 66° C. for 1.5 hours were removed from the bath and allowed to stand for 16 hours at room temperature (23° C.). They were then replaced in the 66° C. bath. After an additional hour, the viscosity of each mixture was measured. None had gelled.

TABLE I

Viscosity$^c$ of Bis(2,3-epoxycyclopentyl) ether/MPDA Mixtures at 66° C.

| Example | Accelerator$^a$ | Time$^b$ (hours) | | | |
|---|---|---|---|---|---|
| | | 0.5 | 1.0 | 1.5 | 1.5 (66° C.) + 16 (23° C.) 1 (66° C.) |
| Example 1 | 4,4'-dihydroxydiphenyl sulfone | 25 | 35 | gelled | — |
| Example 2 | resorcinol | 25 | 48 | gelled | — |
| Example 3 | 4,4'dihydroxybenzophenone | 22 | 37 | gelled | — |
| Control A | NONE | 13 | 18 | 22 | 22 |
| Control B | phenol | 22 | 22 | 22 | 75 |
| Control C | bisphenol A | 25 | 25 | 25 | 48 |
| Control D | 3,3',5,5'-tetra- | 20 | 22 | 32 | 35 |

TABLE I-continued

Viscosity$^c$ of Bis(2,3-epoxycyclopentyl) ether/MPDA Mixtures at 66° C.

| Example | Accelerator$^a$ | Time$^b$ (hours) | | | |
|---|---|---|---|---|---|
| | | 0.5 | 1.0 | 1.5 | 1.5 (66° C.) + 16 (23° C.) 1 (66° C.) |
| Control E | chlorobisphenol A p-chlorophenol | 20 | 22 | 32 | 760 |
| Control F | glycerol | 20 | 20 | 20 | 22 |

$^a$)Concentration of all accelerators: 5 phr
$^b$)After addition of MPDA
$^c$)Viscosity measured in centipoises. EEW of bis(2,3-epoxycylopentyl) ether = 92 g/mole Example 4 and Control G describe viscosity versus time behavior of 3,4-epoxycyclohexylmethyl 3,4-epoxycyclohexane carboxylate/MPDA mixtures. Viscosity measurements were made on samples in the chamber of a Brookfield Thermosel viscometer (obtained from Brookfield Engineering Laboratories) maintained at a temperature of 66° C. The accelerating effect of 4,4'-dihydroxydiphenyl sulfone on the cure of this epoxy formulation was demonstrated by adding this compound in an easily dissolvable form. A solution containing 20 percent by weight of 4,4'-dihydroxydiphenyl sulfone was prepared by heating the diphenol in Bakelite ERRA-0300 epoxy resin for 1 hour at a temperature of 120° C. ERRA-0300, obtained from Union Carbide, was a mixture of the solid isomers of bis(2,3-epoxycyclopentyl) ether. The solution was allowed to cool to room temperature and solidify. This composition had good stability at room temperature and was a convenient means for adding 4,4'-dihydroxydiphenyl sulfone to epoxy/amine mixtures at moderate temperatures.

Example 4

An accelerated thermosetting epoxy composition was prepared by combining:

14.0 g of 3,4-epoxycyclohexylmethyl 3,4-epoxycyclohexane carboxylate, 3.0 g of the solid solution of 4,4'-dihydroxydiphenyl sulfone in bis-(2,3-epoxycyclopentyl) ether described above, and 3.74 g of m-phenylenediamine. at a temperature of 66° C. This mixture had an NH/epoxide stoichiometry of 1.10. Its viscosity was measured as a function of time. The results as shown in Table

Control G

A thermosetting mixture was prepared by combining 19.0 g of 3,4-epoxycyclohexylmethyl 3,4-epoxycyclohexane carboxylate, and 4.2 g of m-phenylenediamine.

The NH/epoxide stoichiometry of this mixture was 1.10. Its viscosity at a temperature of 66° C was measured periodically as described in Example 4. The results are shown in Table II.

TABLE II

Viscosity$^a$ at 66° C. as a Function of Time

| Resin Formulation | Accelerator | Time (hours) | | | | |
|---|---|---|---|---|---|---|
| | | 0.5 | 1.0 | 1.5 | 2.0 | 2.5 |
| Example 4 | 4,4'-dihydroxydiphenyl sulfone | 86 | 270 | 920 | 3840 | 17,600 |
| Control G | NONE | 42 | 43 | 44 | 46 | 47 |

$^a$Measured in centipoises

Comparison of the viscosity versus time data for Example 4 with that of Control G and Control A (i.e., a bis(2,3-epoxycyclopentyl) ether/MPDA mixture) shows that 4,4'-dihydroxydiphenyl sulfone is an effective accelerator when added as a solid solution in bis(2,3-epoxycyclopentyl) ether.

Example 5 demonstrates the storage stability of bis (2,3-epoxycyclopentyl) ether/4,4'-dihydroxydiphenyl sulfone solutions.

Example 5

A 100 g portion of the solution of 4,4'-dihydroxydiphenyl sulfone in bis-(2,3-epoxycyclopentyl) ether prepared as in Example 1 was maintained at a temperature of 66° C. for 96 hours. At the end of that period, the solution was a clear low viscosity fluid. Analysis of the final solution by liquid chromatography showed that less than 2 percent of the epoxide had reacted with the diphenol.

Examples 6 through 11 and Controls H through K describe the preparation and properties of unreinforced castings. Casting dimensions were ⅛×8×4 to 8 inches. Typically they weighed 80 to 160 g.

The general procedure for making castings was the following: The epoxy resin and accelerator were charged to a 3-necked flask equipped with a paddle stirrer. The contents of the flask were stirred and heated at a temperature of 85° to 100° C. until the accelerator dissolved. The solution was then cooled to a temperature of 70° C. The amine hardener was added to this solution. It dissolved in about 2 to 5 minutes. The resulting solution was subjected to a vacuum of about 28 inches of mercury to remove air bubbles for about 3 minutes. It was then poured into a preheated glass mold with a cavity of dimensions of ⅛×8×8 inches.

Castings were tested to determine tensile properties and heat deflection temperature. Tensile properties were measured according to ABTM D-638 using a Type I dogbone specimen. Heat deflection temperature was measured according to ASTM D-648 (264 psi stress).

Examples 6 through 8 and Control H describe unreinforced castings made with the following cure schedule: 2 hours at 85° C.; 85° to 150° C. at 1° C./minute: 1 hour at 150° C.

Example 6

A solution containing 190 g of bis-(2.3-epoxycyclopentyl) ether and 10 g of 4,4'-dihydroxydiphenyl sulfone was prepared as described in Example 1. A 60 g portion of this solution was blended with 18.4 g of MPDA, poured into a mold, and cured as described above. The tensile properties and heat deflection temperature of the cured casting are given in Table III.

Example 7

The procedure in Example 6 was repeated except that the amount of 4,4'-dihydroxydiphenyl sulfone was reduced by one half. The data on this casting are shown in Table III.

Control H

A thermosetting composition was prepared by blending 60 g of bis(2,3-epoxycyclopentyl) ether with 18.4 g of MPDA. A casting was then prepared by the procedure as described above. The properties of the casting made from this composition are shown in Table III.

Example 8

A copolymer of bis(2,3-epoxycyclopentyl) ether and ethylene glycol (i.e. ERLA-4617 obtained from Union Carbide Corporation), 93.7 g, and 6.4 g of 4,4'-dihydroxydiphenyl sulfone were heated at a temperature of 100° C. for 0.5 hours with stirring to dissolve the diphenol. This solution was cooled to a temperature of 80° C. and treated with 21.2 g of MPDA. This solution was poured into a mold and cured. The properties of the casting are shown in Table III.

TABLE III

Unreinforced Casting Properties

| Resin Formulation | Example 6 | Example 7 | Control H | Example 8 |
|---|---|---|---|---|
| Bis(2,3-epoxycyclo-pentyl) ether (g) | 57 | 58.5 | 60 | — |
| Ethylene glycol/Bis (2,3-epoxycyclopentyl) ether copolymer$^a$ (g) | — | — | — | 93.7 |
| MPDA (g) | 18.4 | 18.4 | 18.4 | 21.2 |
| 4,4'-Dihydroxydi-phenyl sulfone (g) | 3 | 1.5 | — | 6.4 |
| CASTING PROPERTIES | | | | |
| Tensile Strength ($10^3$ psi) | 16.0 | 14.8 | 16.2 | 16.1 |
| Tensile Modulus ($10^3$ psi) | 702 | 697 | 716 | 807 |
| Elongation (%) | 2.8 | 2.6 | 2.8 | 2.3 |
| Heat Deflection Temperature (°C.) | 203 | 174 | 156 | 104 |

$^a$Epoxy equivalent wt. = 120 g/mole

Examples 9 through 11 and Control I describe other unreinforced castings. Resin formulations, casting properties, and cure schedules are shown in Table IV.

The data in Tables III and IV show that the cure accelerators of this invention may be used with a wide variety of epoxides and aromatic amines.

In Table III, higher heat deflection temperatures are obtained in bis(2,3-epoxycyclopentyl) ether/MPDA castings containing 4,4'-dihydroxydiphenyl sulfone than in the Control. In Example 8, a high level of properties are also obtained with the ethylene glycol/bis(2,3-epoxycyclopentyl) ether copolymer resin. Note that the tensile strengths of all castings in Table III are very high. Other accelerators such as borontrifluoride: monoethylamine complexes do not produce unreinforced castings with such high mechanical properties. Tensile strength and elongation measurements are sensitive to defects in the sample so that small differences between samples (e.g., tensile strengths of 14,000 psi versus 16,000 psi) do not serve as a basis of differentiation. In contrast, heat deflection temperature is a bulk property of the material and is much less affected by defects.

In Table IV, the casting in Control I was so severely undercured that it could not be tested. In contrast, the accelerated composition of Example 9 afforded a casting with good mechanical properties. Example 10 shows that mixtures of cycloaliphatic epoxides and glycidyl epoxides can be cured with the accelerators of this invention.

TABLE IV

Unreinforced Casting Data

| Resin Formulation | Example 9 | Control I | Example 10 | Example 11 |
|---|---|---|---|---|
| Epoxy Resin | | | | |
| 3,4-Epoxycylohexyl-methyl 3,4-epoxycyclohexyl carboxylate (g) | 95.0 | 95 | 80 | — |
| Bis(2,3-epoxycyclo-pentyl) ether (g) | — | — | — | 60 |
| Epoxy Novolac$^a$ (g) | — | — | 20 | — |
| Amine Hardener | — | — | | |
| MPDA (g) | 24.1 | 24.1 | 21.9 | — |
| 4,4'-Bis(3-amino-phenoxy)diphenyl sulfone (g) | — | — | — | 88 |
| Accelerator | 5.0 | — | 4.0 | 3.0 |
| 4,4'-dihydroxydi-phenyl sulfone (g) | | | | |
| CASTING PROPERTIES | | | | |
| Tensile Strength ($10^3$ psi) | 7.5 | TOO BRITTLE TO TEST | 6.6 | 11.7 |
| Tensile Modulus ($10^3$ psi) | 597 | | 621 | 590 |
| Elongation (%) | 1.3 | | 1.1 | 2.3 |
| Heat Deflection Temperature (°C.) | 138 | | 140 | 147 |
| Cure Schedule$^b$ | A | A | A | B |

$^a$D.E.N. 438 obtained from Dow Chemical Co., Midland, MI. Epoxy equivalent wt = 180 g/mole
$^b$Cure Schedule A = 2 hrs at 85° C.; 85 to 160° C. at 1° C./min; 1 hr at 130° C.; 130 to 179° C. at 1° C./min; 2 hrs at 160° C.
Cure Schedule B = 2 hrs at 85° C.; 85 to 130° C. at 1° C./min; 2 hrs at 179° C.

Example 12

Example 12 describes the preparation of a unidirectional carbon fiber composite using the composition of this invention. The prepreg is made using a polyacrylonitrile-based carbon fiber with a tensile strength of $6.6 \times 10^5$ psi and a tensile modulus of $36 \times 10^6$ psi.

A tow of carbon fiber containing 6000 filaments is drawn through a resin bath containing the resin formulation shown in Example 6. The impregnated fiber is wound on an 8 inch square frame to a thickness of approximately ⅛ inch. The impregnated fiber in the frame contains approximately 35 percent by weight of resin. The resin is cured by placing the frame in an oven and heating with a programmed cure cycle. The cure cycle is 2 hours at 85° C. to 160° C. at 1° C./minute, hold 2 hours at 160° C. The frame is removed from the oven and the cured carbon fiber composite is removed from the frame. The composite has a high level of longitudinal and transverse tensile properties.

What is claimed is:

1. A composition comprising:
  (a) a cycloaliphatic epoxy resin containing two or more 1,2-epoxide groups, (b) an aromatic amine hardener, and
(c) a cure accelerator selected from

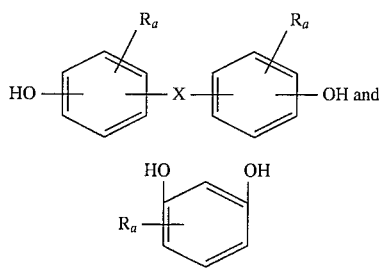

wherein X is selected from $SO_2$, SO, $C(CF_3)_2$,

R is selected from halogen or alkyl of 1 to 4 carbon atoms, or

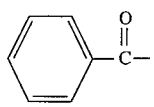

and a is 0 to 2.

2. A composition as defined in claim 1 wherein the cure accelerator is selected from one or more of the following: 4,4'-dihydroxydiphenyl sulfone, resorcinol, 2,2-bis(4-hydroxyphenyl) hexafluoropropane, 4,4'-dihydroxydiphenyl sulfoxide, 2,4-dihydroxybenzophenone, 4,4'-dihydroxybenzophenone, and 4,4'-dihydroxy 3,3'-dichlorodiphenyl sulfone.

3. A composition as defined in claim 1 wherein the aromatic hardener is selected from one or more of the following: 4,4'-diaminodiphenyl ether, 4,4'-diaminodiphenyl methane, 3,3'-diaminodiphenyl methane, 4,4'-diaminodiphenyl sulfone, m-phenylenediamine, p-phenylenediamine, 4,4'-diaminodiphenylpropane, 4,4'-diaminodiphenyl sulfide, 1,4-bis(p-aminophenoxy)benzene, 1,3-bis-(m-aminophenoxy)benzene, diethyltoluenediamine, 1,3-bis(p-aminophenoxy) benzene, adducts of epoxy resins with the above diamines, the adducts of a bisphenol-A epoxy resin with a molar excess of 4,4-diaminodiphenyl sulfone, 4,4' bis(3-aminophenoxy)diphenyl sulfone, 2,2-bis(4-aminophenoxyphenyl)propane and trimethylene glycol di-para-aminobenzoate.

4. A composition as defined in claim 1 wherein the cycloaliphatic epoxide is bis(2,3-epoxycyclopentyl) ether.

5. The composition of claim 1 wherein said cure accelerator is resorcinol.

6. The composition of claim 1 wherein said cure accelerator is 4,4'-dihydroxydiphenyl sulfone.

7. The composition fo claim 1 comprising from 20 to about 90 wt % of said cycloaliphatic epoxy resin, from 15 to about 80 wt % of said aromatic amine hardener, and from about 0.1 to about 10 wt % of said cure accelerator.

8. In a composition comprising from 20 to about 90 wt % of a cycloaliphatic epoxy resin containing a plurality of 1,2-epoxide groups, from 15 to about 80 wt % of an aromatic amine hardener and, optionally, up to 90 wt % of a structural fiber, up to 40 wt % of a coepoxide and up to 20 wt % of a thermoplastic, the improvement wherein from 0.1 to about 10 wt % of a cure accelerator having a structural formula selected from the group consisting of

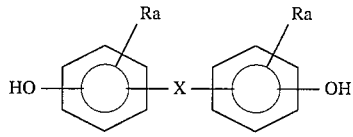

and

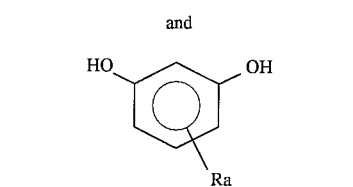

wherein X is selected from the group consisting of $SO_2$, SO, $C(CF_3)_2$, C(O)NH, C(O), AND $CO_2$;, R is selected from the group consisting of halogen, and alkyl of 1–4 carbon atoms and a is an integer of from 0 to 2.

9. The composition of claim 8 wherein the cure accelerator is a dihydroxy compound selected from the group consisting of 4,4'-dihydroxydiphenyl sulfone, resorcinol, 2,2-bis(4-hydroxyphenyl) hexafluoropropane, 4,4'-dihydroxydiphenyl sulfoxide, 2,4-dihydroxybenzophenone, 4,4'-dihydroxybenzophenone, and 4,4'-dihydroxy-3,3'-dichlorodiphenyl sulfone.

10. The composition of claim 8 wherein the cure accelerator is resorcinol.

11. The composition of claim 8 wherein the cure accelerator is 4,4'-dihydroxydiphenyl sulfone.

* * * * *

UNITED STATES PATENT AND TRADEMARK OFFICE
CERTIFICATE OF CORRECTION

PATENT NO. : 5,599,628

DATED : February 4, 1997

INVENTOR(S) : Hugh C. Gardner

It is certified that error appears in the above-identified patent and that said Letters Patent is hereby corrected as shown below:

| Col. | Line | |
|---|---|---|
| 1 | 26 | reads "... and hisphenol A accelerated..."<br>should read --... and bisphenol A accelerated...-- |
| 1 | 59 | reads "... containing hisphenol A epoxy"<br>should read --... containing bisphenol A epoxy-- |
| 5 | 21 | reads "4,4°-dihydroxydiphenyl sulfide"<br>should read --4,4'-dihydroxydiphenyl sulfide-- |
| 6 | 54 | reads "...-4 aminophenol. available as"<br>should read --...-4 aminophenol, available as-- |
| 7 | 23 | reads "... carboxyl ate,..."<br>should read --... carboxylate,...-- |
| 7 | 33-4 | reads "... 1,3-his(m-aminophenoxy) benzene,"<br>should read --... 1,3-bis(m-aminophenoxy) benzene,-- |
| 7 | 62 | reads "hisphenol A,..."<br>should read --bisphenol A,...-- |

UNITED STATES PATENT AND TRADEMARK OFFICE
CERTIFICATE OF CORRECTION

PATENT NO. : 5,599,628
DATED : February 4, 1997
INVENTOR(S) : Hugh C. Gardner

It is certified that error appears in the above-identified patent and that said Letters Patent is hereby corrected as shown below:

| Col. | Line |  |
|------|------|--|
| 8 | 16-7 | reads "...hydroguinone..."<br>should read --... hydroquinone..." |
| 8 | 49 | reads "... from E.I. dupont..."<br>should read --    from E.I. duPont...-- |
| 9 | 66 | reads "was charged with 190 g bis..."<br>should read --was charged with 190 g of bis...-- |
|   |    | should read --3-epoxycyclopentyl) ether...-- |
| 11 | 54 | reads "results as shown in Table"<br>should read --results as shown in Table II.-- |
| 12 | 50 | reads "... according to ABTM D-638..."<br>should read --... according to ASTM D-638...-- |
| 12 | 61 | reads "... bis-(2.3-epoxycyclopentyl)"<br>should read --... bis-(2,3-epoxycyclopentyl)-- |

UNITED STATES PATENT AND TRADEMARK OFFICE
CERTIFICATE OF CORRECTION

PATENT NO. : 5,599,628
DATED : February 4, 1997
INVENTOR(S) : Hugh C. Gardner

It is certified that error appears in the above-identified patent and that said Letters Patent is hereby corrected as shown below:

| Col. | Line | |
|---|---|---|
| 14 | 40 | (Table IV notes) reads "bCure Schedule A = 2 hrs at 85°C.; 85 to 160°C. at 1°C./min; 1 hr at 130°" should read --bCure Schedule A = 2 hrs at 85°C.; 85 to 160°C. at 1°C./min; 2 hrs at 160°-- |
| 14 | 41 | reads "C.; 130 to 179°C. at 1°C./min; 2 hrs at 160°C." should read --C.-- |
| 14 | 42 | reads "Cure Schedule B = 2 hrs at 85°C.; 85 to 130°C. at 1°C./min; 2 hrs at 179°" should read --Cure Schedule B = 2 hrs at 85°C.; 85 to 130°C. at 1°C./min; 1 hr at 130°-- |
| 14 | 43 | reads "C." should read --C; 130 to 179°C. at 1°C./min; 2 hrs at 179°C.-- |

Signed and Sealed this

Thirteenth Day of October 1998

Attest:

BRUCE LEHMAN

*Attesting Officer*    Commissioner of Patents and Trademarks